Patented Jan. 9, 1945

2,366,873

UNITED STATES PATENT OFFICE 2,366,873

MINERAL OIL COMPOSITION

Orland M. Reiff, Woodbury, N. J., assignor to Socony-Vacuum Oil Company, Incorporated, New York, N. Y., a corporation of New York No Drawing. Application April 10, 1940, Serial No. 328,873

13 Claims. (Cl. 252—48)

This invention has to do in a general way with mineral oil compositions and is more particularly related to mineral oil compositions of the type used as lubricants, dielectrics, etc., to which an agent has been added for the purpose of improving the oil in certain respects. It is an object of this invention to provide a novel class of mineral oil addition agents which will improve one or more important properties of a mineral oil fraction. It is a further object to provide mineral oil compositions containing such addition agents.

In my copending application Serial No. 222,755, filed August 3, 1938, now issued as Patent 2,197,-835, of which this application is a continuation in part, I have described a general class of "metallo-wax-aryl" compounds as mineral oil addition agents which are multifunctional in that they are effective to reduce the pour point, improve the viscosity index, and retard the deleterious effects of oxidation in the oil to which they are added. The present invention is predicated upon the discovery that the sulfur derivatives or, more specifically, the sulfides (monosulfides and polysulfides) of metalorganic compounds of the type disclosed in the aforesaid application are improved in certain respects over the corresponding metalorganic compounds. In addition to the sulfides my invention also contemplates the corresponding derivatives of the related elements selenium and tellurium.

The present invention is concerned with sulfur, selenium or tellurium condensation compounds corresponding to a particular class of the metalorganic compounds disclosed in the aforesaid application. More specifically, this invention is directed to the sulfides and related selenides and tellurides of alkyl substituted aryl metal oxides. The alkylated aryl metal oxides corresponding to the sulfides and related condensation products contemplated herein are disclosed in my copending application Serial No. 206,683 filed May 7, 1938.

The addition agents of the present invention are, like those of the last mentioned copending application, characterized by the presence of an hydroxyaromatic nucleus in which the hydroxyl hydrogen is substituted with its equivalent weight of metal. Also, like the addition agents of the said copending application, the present addition agents are characterized by substitution of at least one nuclear hydrogen atom with an oil solubilizing substituent, such as an alkyl group derived from an aliphatic hydrocarbon material of sufficient solubilizing value to render the condensation product oil miscible. By the term oil miscible or oil soluble I have reference to the property of remaining uniformly dispersed in mineral oil under normal conditions of handling and use. Preferably for obtaining an oil miscible condensation product of multifunctional properties this oil solubilizing alkyl group should contain at least twenty carbon atoms.

The oil addition agents of the present invention are distinguished from those of copending application 206,683 in that they are characterized by the presence of at least two aromatic nuclei, having an OM substituent and an oil solubilizing substituent as aforesaid which are interconnected by at least one atom of an element selected from the group consisting of sulfur, selenium, and tellurium. Through introduction of a sulfur linkage, for example, in the manner or manners to be hereinafter described, I obtain what may be broadly termed a sulfide of an alkyl-substituted aryl metal oxide in which the oxygen of the metal oxide group is attached to the aryl nucleus. This general class of sulfides of alkylated aryl metal oxides distinguishes over the corresponding general class of alkylated aryl metal oxides in that the sulfides are of increased effectiveness in retarding the deleterious effects of oxidation in the oil. In the preferred multifunctional class of compounds, wherein the aryl nucleus is substituted with heavy alkyl groups, I have found that these sulfides, in general, possess increased pour point depressing and viscosity index improving properties over the corresponding multifunctional compounds in the alkylated aryl metal oxides. In addition to the last-mentioned improvements, the multifunctional sulfides also have improved inhibiting action against the formation of oxidation products. The improved inhibiting properties are particularly significant in retarding the development of acidity in certain types of oils under certain conditions of use.

The compounds or condensation products contemplated herein as oil addition agents may be characterized by the general formula I 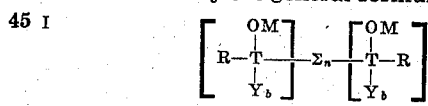

in which T represents a monocyclic or polycyclic aromatic nucleus; Σ represents sulfur, selenium, or tellurium; $n$ represents a whole number from one to four and R represents an alkyl group which should contain at least ten carbon atoms to impart mere oil solubility or miscibility to the compound and should contain at least twenty carbon atoms to impart multifunctional properties to the compound. OM represents at least one hydroxyl group the hydrogen of which has been substituted with its equivalent weight of metal and $Y_b$ represents residual hydrogen or a substituent group in the aryl nucleus T, as will be hereinafter more fully described.

As aforesaid, the preferred multifunctional oil improving agents are those in which R of general formula I represents at least one heavy alkyl group having at least twenty carbon atoms, and, as will hereinafter appear, these so-called "heavy alkyl groups" for imparting multifunctional properties to the compound may be derived from aliphatic hydrocarbon material predominantly comprised of aliphatic compounds of at least twenty carbon atoms such as a petroleum wax or more specifically paraffin wax.

In addition to the oil solubilizing alkyl group (R), the aryl nucleus may contain residual hydrogen a part or all of which may be substituted with other substituents which may have positive, or negative, or neutral oil-solubilizing effect. Such residual hydrogen and substituents are, as aforesaid, indicated by $Y_b$ in the general formula, wherein Y is defined as selected from the group consisting of hydrogen, hydroxyl, ester (organic or inorganic acyl group) keto, alkoxy, alkyl sulfide, aryl sulfide, aroxy, ether alcohol, aldehyde, thioaldehyde, oxime, amide, (organic or inorganic acyl group), thioamide, carbamide, aralkyl, aryl, alkaryl, halogen, nitroso, amino, nitrosamine, amidine, imine, N-thio, diazo, hydrazine, cyano, azoxy, azo, and hydrazo radicals and $b$ represents the number of Y substituents and is equal to zero or a whole number corresponding to the number of replaceable nuclear hydrogens not substituted with OM, $\Sigma_n$ and R.

In general, it appears that any metal may be employed as the metal M in compounds or condensation products of the aforesaid type to provide valuable oil addition agents. The metals contemplated herein may be broadly classified as metals of groups I to VIII inclusive of the periodic system. These metals comprise the following: the alkali metals: lithium, sodium, potassium, rubidium, and caesium; the alkaline earth group: beryllium, magnesium, calcium, strontium, and barium; the metals zinc, cadmium, mercury, scandium; the metals aluminum, gallium, indium, thallium, titanium, zirconium, cerium, thorium; germanium, tin and lead; vanadium, columbium, and tantalum; arsenic, antimony, and bismuth; chromium, molybdenum, tungsten, and uranium; rhenium, manganese, iron, cobalt, and nickel; ruthenium, rhodium, and palladium; osmium, iridium, and platinum.

Some of the rare earth metals are given in the foregoing. Other rare earth metals suitable for use in the metal oxide group of the sulfides of alkylated aryl metal oxides contemplated herein are those now commercially available as the cerium and yttrium group: namely, a mixture of praseodymium, neodymium, samarium, europium, gadolinium, terbium, dypsprosium, holmium, erbium, thallium and lutecium.

The selection of a metal will, of course, depend to a certain extent upon the character of the oil to which the addition agent is added and the conditions under which it is to be used. Certain metals such as lead, zinc and tin for example may contribute to the oiliness characteristics of the oil. A preferred group of metals which have been incorporated in sulfides of alkylated aryl metal oxides and tested in mineral oil compositions of the type contemplated herein are cobalt, tin, aluminum and sodium, with special preference given to tin.

As aforesaid, the aryl nucleus T may be monocyclic or polycyclic corresponding, for example, to phenol, hydroxydiphenyl, naphthol, anthrol and their derivatives. A preferred condensation product derived from alkyl-substituted phenol (hydroxy benzene) may, in its simplest form, be represented by the general formula II 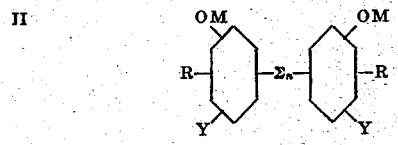

Since the condensation reaction employed in synthesizing the sulfides may be attended by further condensation beyond that indicated in Formula II, such further condensed compounds, hereinafter termed "polymers" are contemplated herein as coming within general Formula I and as coming under the terms "sulfides," "condensation products" etc., as employed herein. Polymers of this character which may be associated with or formed instead of the simple compound of Formula II may be represented by the following formula:

III 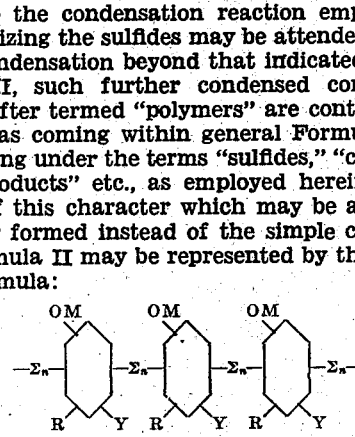

Also, where alkylation of the aryl nucleus has been effected to obtain a multifunctional product by a preferred procedure which involves the Friedel-Crafts condensation of a phenol with a halogenated high molecular weight aliphatic hydrocarbon material (such as chlorinated petroleum wax) such condensation may result in the formation of compounds or a mixture of compounds in which two or more phenol groups are interconnected by one or more aliphatic hydrocarbon chains. Alkylated phenols of this type when further reacted to form the sulfides and their phenate derivatives, may result in the formation of compounds or mixtures of compounds corresponding for example to the following general formulae:

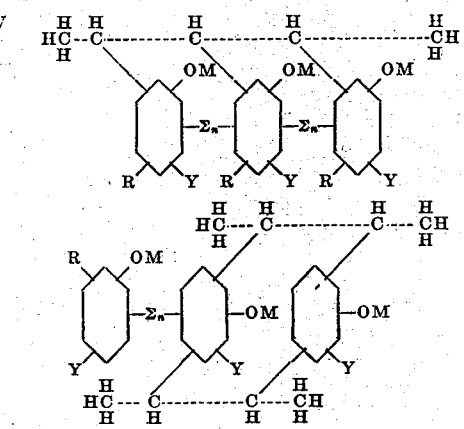

In the general Formulae IV and V above the hydrocarbon chains represent polyvalent alkyl groups corresponding to R of general Formula I above.

The foregoing discussion is not intended as a development of the specific molecular composition or structure of the representative compounds or condensation products constituting the mineral oil improving agents contemplated herein but is intended to be merely indicative or illustrative of the possible composition of addition agents coming within the general scope of this invention. These addition agents may be characterized as the sulfides (or corresponding selenides and tellurides) of alkylated hydroxyaromatic compounds in which the hydroxyl hydrogen is substituted with its equivalent weight of metal. Irrespective of any further condensation toward the formation of complex compounds of the type illustrated in Formulae II to V inclusive, it will be observed that in all cases the compounds or condensation products are characterized by having at least once, therein, the grouping corresponding to general Formula I. These more complex condensation products are also characterized by the fact that they contain at least two of the metal-oxy and alkyl substituted aryl nuclei interconnected by at least one atom from the group consisting of sulfur, selenium and tellurium.

As aforesaid the term "sulfide," as used herein, is inclusive of the monosulfides, disulfides, trisulfides, tetrasulfides, etc.; that is, it includes both monosulfides and polysulfides and is also inclusive of such polymers and related complex derivatives as may be formed by the hereinafter described procedures. These sulfur derivatives or sulfides of alkylated aryl metal oxides are the preferred class of addition agents contemplated herein and for that reason the illustrative procedures and typical examples given herein relate to the sulfides. The corresponding selenides and tellurides are, however, contemplated by and come within the scope of the broad inventive concept.

The general procedure for synthesizing the sulfides of alkylated aryl metal oxides is to first form the alkylated hydroxyaryl sulfide and then substitute the hydroxyl hydrogen with metal.

The alkylated hydroxyaryl sulfides can be prepared by the reaction of alkylated hydroxyaromatic compounds with sulfur or with sulfur halides. With sulfur dichloride for example the monosulfide linkage ($n=1$ in general Formula I) is formed and with sulfur monochloride the disulfide linkage ($n=2$) is formed. By reaction with elementary sulfur, the main products contain monosulfide linkages with H$_2$S evolved in the condensation reaction. Sulfur condensation products or "sulfides" of higher sulfur content can be formed by (a) reaction of alkylated thiophenols (aryl mercaptans) with sulfur monochloride or sulfur dichloride, and (b) reaction of a compound having a disulfide linkage with sulfur, or alkali polysulfides or alkyl tetrasulfide.

The alkylation of the hydroxyaromatic compound may be carried out in various ways. A preferred procedure is to subject a hydroxyaromatic compound or an oxyaromatic compound to a Friedel-Crafts condensation reaction with a halogenated aliphatic hydrocarbon, which for obtaining the preferred multifunctional addition agents should be an aliphatic hydrocarbon containing at least twenty carbon atoms or a mixture of aliphatic compounds predominantly comprised of compounds having at least twenty carbon atoms. This alkylation may also be carried out with unsaturated hydrocarbons or aliphatic alcohols, using H$_2$SO$_4$ or anhydrous aluminum chloride as a catalyst. In alkylating phenols with high molecular weight alcohols however, it is preferred to convert the alcohol to the corresponding halide (or polyhalide) and then condense the alkyl halide with the hydroxyaromatic compound by the Friedel-Crafts reaction. For obtaining the preferred multifunctional addition agent with unsaturated hydrocarbons or aliphatic alcohols they should be high molecular weight compounds containing at least twenty carbon atoms such, for example, as eicosylene, cerotene, melene, polymerized isobutylene, etc., and myricyl alcohol, ceryl alcohol, etc.

The Friedel-Crafts synthesis is preferred for obtaining the alkylated hydroxyaromatic compound, and as a source of the alkyl substituent preference is given to mixed high molecular weight hydrocarbons typified by those which characterize the heavier products of petroleum, such as heavy petroleum oils of the lubricant type, petrolatum and crystalline petroleum wax or other compounds which will result in relatively long chain aliphatic substituents. Special preference is given to petroleum wax (paraffin wax) of melting point not substantially less than about 120° F., which is predominantly comprised of aliphatic hydrocarbons having a molecular weight of at least 350 and containing at least twenty carbon atoms.

Hydroxyaromatic compounds which may be used in the alkylation reaction are mono- or polycyclic and mono- or poly-hydric hydroxyaromatic compounds which may or may not be otherwise substituted, as hereinafter indicated. Specific examples of compounds which may be used in this reaction are: phenol, resorcinol, hydroquinone, catechol, cresol, xylenol, hydroxydiphenyl, benzylphenol, phenylethyl phenol, phenol resins, methylhydroxydiphenyl, alpha and beta naphthol, xylyl naphthol, benzyl phenol, anthranol, phenylmethyl naphthol, phenanthrol, anisole, beta naphthyl methyl ether, chlorphenol, and the like. Preference in general is to the monohydroxy phenols otherwise unsubstituted, particular preference being given to phenol and alpha and beta naphthol. Mixed alkyl-aryl and aralkyl-aryl ethers such as anisole and beta-naphthylmethyl ether are given as examples because the Friedel-Crafts reaction with these ethers is accompanied by some rearrangement, yielding free hydroxyl groups.

Where it is desired to obtain a compound or condensation product in which the aryl nucleus contains in addition to, or instead of, residual hydrogen, a substituent of the type classified in general Formula I as Y$_b$, it is pointed out that with the exception of substituents such as aralkyl, aryl, alkaryl, halogen, hydroxyl, and aroxy, such Y groups are introduced after alkylating the hydroxyaromatic compound. The usual methods for the introduction of these substituents into non-alkylated hydroxyaromatic compounds may be employed in connection with the alkylated hydroxyaromatic compounds contemplated herein. To those skilled in the art, it will be apparent that the Y substituents are mainly derivatives of phenolic (—OH) groups, amino groups, aldehyde and keto groups and carboxyl groups. Methods for the introduction of such base substituents along with phenolic —OM groups will be apparent from methods described in my aforesaid copending application Serial No. 222,755. It should also be pointed out that where nuclear substituents are present containing methylene groups such as alkyl, keto, ether, ester radicals, etc., the same may also carry the Y type of substituents such as halogen, hydroxyl, amino, cyano, nitro, thio groups, etc., excepting those which are of strictly aromatic origin, such as those resulting from diazotization, for instance. The methods for introducing these substituents are also well known to those skilled in the art.

As aforesaid the preferred products contemplated herein are those having multifunctional properties wherein the alkyl substituent in the aryl nucleus contains at least twenty carbon atoms. In this preferred class of compounds special preference is given to the condensation products derived from alkyl substituted hydroxyaromatic compounds in which the alkyl substituent is derived from petroleum wax. The details in a typical procedure for synthesizing these so-called wax substituted hydroxyaromatic compounds (wax phenol) are described in my copending application 206,638. Briefly this procedure involves reacting a chlorinated wax such as chlorinated paraffin wax with a phenol in the presence of a Friedel-Crafts catalyst at elevated temperature. The chlorinated wax should have a chlorine content of from 10 percent to 16 percent and the reaction mixture may contain about three atomic proportions of chlorine (in a chlorwax of 16% chlorine content) to one molecular proportion of phenol. A "wax phenol" obtained from such a reaction mixture may be designated as wax phenol (3-16). Parenthetical expressions of the type (A-B) will be used hereinafter in connection with the wax substituted derivatives to designate (A) the number of atomic proportions of chlorine in the chlorinated wax reacted with one mol of hydroxyaromatic compound and (B) the chlorine content of the chlorinated wax. In the above example A=3 and B=16. The same designation will also apply to the sulfides of the wax aryl metal oxides which constitute the ultimate product derived from the wax phenol.

Illustrative procedures which may be followed in preparing the sulfides of alkyl substituted hydroxyaromatic compounds and the sulfides of alkylated aryl metal oxides derived therefrom are given in the following examples, wherein the "alkylated phenol" is preferably a wax substituted phenol of the type last described above for obtaining a multifunctional oil improving agent.

EXAMPLE ONE

SYNTHESIS OF ALKYLATED HYDROXYLARYL SULFIDES

A. Monosulfide linkage

*Reaction mixture*

Alkylated phenol ------------------ mol-- 1
Sulfur dichloride ------------------ mol-- ½
Carbon disulfide, benzene, chlorbenzene or ethylene dichloride as solvent
    part by weight-- 1

B. Disulfide linkage

*Reaction mixture*

Alkylated phenol ------------------ mol-- 1
Sulfur monochloride --------------- mol-- ½
Carbon disulfide, benzene, chlorbenzene or ethylene dichloride as solvent
    part by weight-- 1

PROCEDURE

The alkylated phenol is dissolved in the solvent and brought to a temperature of about 100° F., followed by addition of the sulfur halide. The sulfur halide is introduced slowly, requiring about ½ hour for the addition, followed by refluxing the mixture about one hour to complete the reaction. HCl is evolved in the reaction, resulting in fixation of sulfur in the aryl nucleus. After completion of the condensation reaction, the mixture is water-washed to remove the dissolved hydrochloric acid, followed by removal of diluents to give the finished product.

C. Tri or tetrasulfide linkage

By reaction of the disulfide type of compound with elementary sulfur or alkali polysulfides or alkyl tetrasulfides, one or two atoms of sulfur can be added to the disulfide linkage, resulting in formation of the tri or tetrasulfide derivative, respectively. The use of alkyl tetrasulfides is preferred in this type of reaction.

*Reaction mixture*

Alkylated phenol disulfide ---------- mol-- 1
Ethyl tetrasulfide ------------------ mol-- 1
Carbon disulfide or ethylene dichloride as solvent --------------- part by weight-- 1

PROCEDURE

The alkylated phenol disulfide in solution in carbon disulfide, benzene, chlorbenzene or ethylene dichloride, is brought to a temperature of about 100° F. and treated with the ethyl tetrasulfide, followed by refluxing the mixture during a one-hour period to complete the addition of sulfur. The solvent is then distilled to give the finished product.

EXAMPLE TWO

METAL DERIVATIVES OF ALKYLATED HYDROXYAROMATIC SULFIDES

The metal oxides (phenates, naphtholates, etc.) of alkylated aromatic sulfides may be obtained and purified according to the same general procedures described in my copending application 206,683 for synthesizing alkylated aryl metal oxides.

In the formation of the alkali metal derivative, the alkylated phenol sulfide is reacted with an alcoholate of the desired alkali metal. In the formation of derivatives of other classes of metals, the preferred procedure consists in treating the alkylated phenol sulfide with an equivalent of the salt of the desired metal in alcohol solution, followed by reaction with an equivalent amount of a sodium alcoholate, resulting in the formation of the alcoholate of the desired metal as the initial product. By heating the mixture to about 300° F. for a period of about one hour, the metal alcoholate is reacted with the hydroxyl group resulting in the formation of the metal phenate derivative. Normal inorganic or fatty acid salts as well as the oxy salts thereof can be used in the formation of the metal derivatives.

Typical compounds or condensation products obtained according to the foregoing procedure where wax phenol (3-16), for example, was used as the initial reactant may be designated as metal phenates of wax phenol disulfide (3-16); metal phenates of wax-phenol monosulfides (3-16) etc. Where a wax substituted naphthol is used as the initial reactant the products may be similarly designated as metal naphtholates of wax-naphthol sulfides.

To demonstrate the improved properties obtained in mineral oil blends containing addition agents of the type contemplated herein, I have conducted comparative tests with representative mineral oils alone and blended with typical sulfides of alkylated aryl metal oxides. The results of these tests are discussed in the following examples.

EXAMPLE THREE

POUR POINT DEPRESSION

These tests were conducted with a motor oil having a Saybolt viscosity of 67 seconds at 210° F. and a pour point of +20° F. The pour points of blends formed from this oil and representative sulfides of wax-aryl metal oxides are given in Table I below:

Table I

| Addition agent | Conc. by wt. | A. S. T. M. pour point |
|---|---|---|
| | Percent | °F. |
| None | ---------- | +20 |
| Cobaltous phenate of wax-phenol disulfide (3–16) | 1/8 | +5 |
| Stannous phenate of wax-phenol disulfide (3–16) | 1/8 | −10 |
| Aluminum phenate of wax-phenol disulfide (3–16) | 1/8 | −15 |
| Sodium phenate of wax-phenol disulfide (3–16) | 1/8 | −15 |
| Cobaltous phenate of wax-phenol monosulfide (3–16) | 1/8 | −10 |
| Stannous naphtholate of wax-alpha naphthol disulfide (3–15) | 1/8 | 0 |

EXAMPLE FOUR

VISCOSITY INDEX IMPROVEMENT

The data listed in Table II below showing the effectiveness of the addition agents contemplated herein for improving viscosity index were obtained in the conventional manner from the Saybolt viscosity of the oil and the oil blends at 100° F. and 210° F. The oil used was a viscous mineral oil of the lubricant type.

Table II

| Addition agent | Conc. by wt. | Say. vis. 100° F. | Say. vis. 210° F. | V. I. |
|---|---|---|---|---|
| | Percent | | | |
| None | ---------- | 140.7 | 41.8 | 79.3 |
| Cobaltous phenate of wax phenol disulfide (3–16) | 1 | 148.4 | 42.6 | 82.6 |
| Cobaltous phenate of wax phenol monosulfide (3–16) | 1 | 149.8 | 42.5 | 82.9 |
| Stannous naphtholate of wax naphthol disulfide (3–15) | 1 | 147.1 | 42.9 | 97.6 |

EXAMPLE FIVE

INHIBITION OF OXIDATION

In addition to the foregoing tests we have also made a test on an oil and an oil blend containing a representative improving agent of the type contemplated by this invention to determine the comparative behavior of the unblended oil and the improved oil under actual operating conditions. The test was carried out in a single cylinder CFR engine. The engine was operated continuously over a time interval of 28 hours, with the cooling medium held at a temperature of about 390° F., at a speed of 1200 R. P. M., which is equivalent to a road speed of about 25 miles per hour. The oil temperature was held at about 150° F. during the test.

The oil used in this test was a lubricating oil stock of 120 seconds Saybolt Universal viscosity at 210° F., and the conditions observed at the end of the test were (a) the extent to which the piston rings were stuck, (b) the extent to which the slots in the oil rings were filled with deposit, (c) the amount of carbonaceous deposits in the oil and (d) the acidity or neutralization number (N. N.) of the oil at the end of the test. The oil indicated as $A_1$, $A_2$ in Table III below is the unblended oil, and oil $B_1$, $B_2$ is the same oil containing an inhibitor.

$B_1$ = 1% of the stannous phenate of wax phenol disulfide (3–16) in mineral oil.
$B_2$ = 1% of the stannous naphtholate of wax alpha naphthol disulfide (3–15) in mineral oil.

Table III

| Oil | Degrees stuck | | | | | Percent slots filled | | | Grams carbon deposit | N. N. |
|---|---|---|---|---|---|---|---|---|---|---|
| | 1 | 2 | 3 | 4 | 5 | 3 | 4 | 5 | | |
| $A_1$ | 360 | 360 | 360 | 360 | 360 | 90 | 80 | 60 | 13.5 | 2.1 |
| $B_1$ | 0 | 0 | 0 | 0 | 0 | 0 | 0 | 0 | 4.1 | 0.2 |
| $A_2$ | 90 | 0 | 240 | 360 | 360 | 70 | 80 | 40 | 18.3 | 2.3 |
| $B_2$ | 0 | 0 | 0 | 0 | 0 | 0 | 0 | 0 | 6.4 | 0.7 |

The amount of addition agent used in the oil may be varied depending upon the character of the oil with which it is blended, the conditions under which the oil is to be used and the properties desired in the final oil blend. These sulfides of alkylated aryl metal oxides may be used in amounts ranging from 1/10 percent to 10 percent and, in general, oil compositions of the desired improved properties may be obtained with amounts in the neighborhood of 1 percent.

It is to be understood that while I have described certain preferred procedures which may be followed in synthesizing the sulfides of alkylated aryl metal oxides of the type contemplated herein and have referred to various representative constituents thereof which render them preferred for use as oil addition agents, such procedures and examples are for illustrative purposes only. The invention, therefore, is not to be considered as limited to the specific examples given but includes within its scope such changes and modifications as fairly come within the spirit of the appended claims.

I claim:

1. An improved mineral oil composition comprising a mineral oil having admixed therewith a minor proportion of an oil miscible condensation product of an alkyl substituted aryl metal oxide in which the oxygen of the metal oxide group is directly attached to the aryl nucleus and in which at least two alkyl substituted aryl nuclei are interconnected by at least one atom of an element selected from the group consisting of sulfur, selenium and tellurium, the said alkyl substituents being comprised of aliphatic hydrocarbon groups containing at least 20 carbon atoms.

2. An improved mineral oil composition comprising a mineral oil having admixed therewith a minor proportion of an oil miscible condensation product of a wax substituted aryl metal oxide in which the oxygen of the metal oxide group is directly attached to the aryl nucleus and in which at least two wax substituted aryl nuclei are interconnected by at least one atom of an element selected from the group consisting of sulfur, selenium and tellurium.

3. An improved mineral oil composition comprising a mineral oil having admixed therewith a minor proportion of an oil miscible condensation product of an alkyl substituted aryl metal oxide in which the oxygen of the metal oxide group is directly attached to the aryl nucleus and in which at least two alkyl substituted aryl nuclei are interconnected by at least one atom of sulfur, the said alkyl substituents being comprised of aliphatic hydrocarbon groups containing at least 20 carbon atoms.

4. An improved mineral oil composition comprising a mineral oil having admixed therewith a minor proportion of an oil miscible condensation product of a wax substituted aryl metal oxide in which the oxygen of the metal oxide group is directly attached to the aryl nucleus and in which at least two wax substituted aryl nuclei are interconnected by at least one atom of sulfur.

5. An improved mineral oil composition comprising a mineral oil having admixed therewith a minor proportion of an oil miscible monosulfide of an alkyl substituted aryl metal oxide in which the oxygen of the metal oxide group is directly attached to the aryl nucleus, the said alkyl substituents being comprised of aliphatic hydrocarbon groups containing at least 20 carbon atoms.

6. An improved mineral oil composition comprising a mineral oil having admixed therewith a minor proportion of an oil miscible polysulfide of an alkyl substituted aryl metal oxide in which the oxygen of the metal oxide group is directly attached to the aryl nucleus, the said alkyl substituents being comprised of aliphatic hydrocarbon groups containing at least 20 carbon atoms.

7. An improved mineral oil composition comprising a mineral oil having admixed therewith a minor proportion of an oil miscible monosulfide of a wax substituted aryl metal oxide in which the oxygen of the metal oxide group is directly attached to the aryl nucleus.

8. An improved mineral oil composition comprising a mineral oil having admixed therewith a minor proportion of an oil miscible polysulfide of a wax substituted aryl metal oxide in which the oxygen of the metal oxide group is directly attached to the aryl nucleus.

9. An improved mineral oil composition comprising a mineral oil having admixed therewith a minor proportion from about $\frac{1}{16}$ percent to about 10 percent of a metal phenate of a wax substituted phenol sulfide.

10. An improved mineral oil composition comprising a mineral oil having admixed therewith a minor proportion, from about $\frac{1}{16}$ percent to about 10 percent, of a metal naphtholate of a wax substituted naphthol sulfide.

11. An improved mineral oil composition comprising a mineral oil having admixed therewith a minor proportion from about $\frac{1}{16}$ percent to about 10 percent of the oil miscible condensation product of an alkyl substituted aryl metal oxide in which the oxygen of the metal oxide group is directly attached to the aryl nucleus and in which at least two aryl nuclei are interconnected by at least one atom of an element selected from the group consisting of sulfur, selenium and tellurium, the said alkyl substituents being comprised of aliphatic hydrocarbon groups containing at least 20 carbon atoms.

12. An improved mineral oil composition comprising a mineral oil having admixed therewith a minor proportion of an oil miscible condensation product of an alkyl substituted aryl metal oxide in which the oxygen of the metal oxide group is directly attached to the aryl nucleus and in which at least two alkyl substituted aryl nuclei are interconnected by at least one atom of an element selected from the group consisting of sulfur, selenium and tellurium, the metal in said metal oxide group being selected from the group consisting of cobalt, tin, aluminum and sodium, the said alkyl substituents being comprised of aliphatic hydrocarbon groups containing at least 20 carbon atoms.

13. An improved mineral oil composition comprising a mineral oil having admixed therewith a minor proportion of a metalorganic condensation compound characterized by having at least once therein the grouping corresponding to the general formula

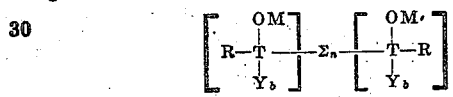

in which T represents an aromatic nucleus; R represents at least one alkyl group containing at least twenty carbon atoms; Y is selected from the group consisting of hydrogen, hydroxyl, ester, keto, alkoxy, alkyl sulfide, aryl sulfide, aroxy, ether alcohol, aldehyde, thioaldehyde, oxime, amide, thioamide, carbamide, aralkyl, aryl, alkaryl, halogen, nitroso, amino, nitrosamine, amidine, imine, N-thio, diazo, hydrazine, cyano, azoxy, azo, and hydrazo radicals; $b$ represents the number of Y's and is equal to zero or a whole number corresponding to replaceable hydrogens on the nucleus T not substituted with R, OM and $\Sigma_n$; M represents the hydrogen equivalent of a metal; $\Sigma$ represents an element selected from the group consisting of sulfur, selenium and tellurium; and $n$ represents a whole number from one to four.

ORLAND M. REIFF.